Oct. 3, 1967   H. F. SHEKELS   3,344,939
SCRAP CHARGING BOX
Filed Sept. 3, 1965   2 Sheets-Sheet 2
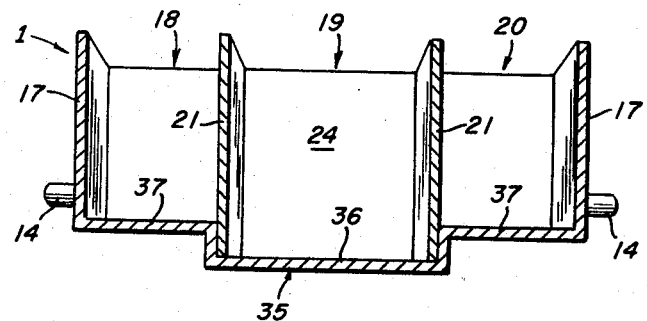
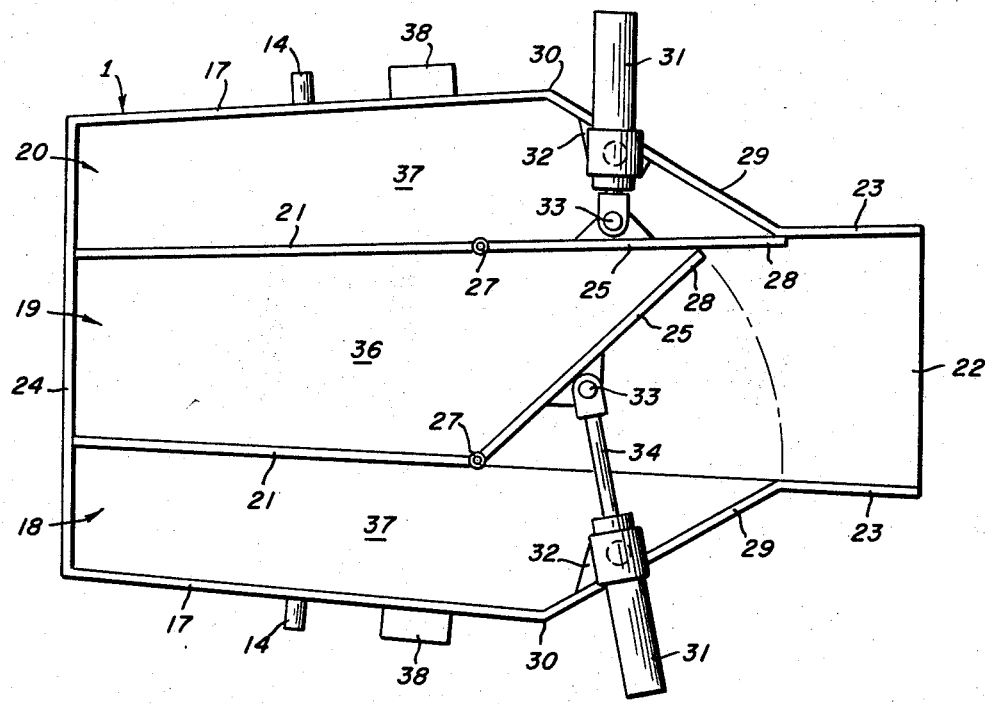
INVENTOR
HAROLD F. SHEKELS
By Donald G. Dalton
Attorney United States Patent Office 3,344,939
Patented Oct. 3, 1967

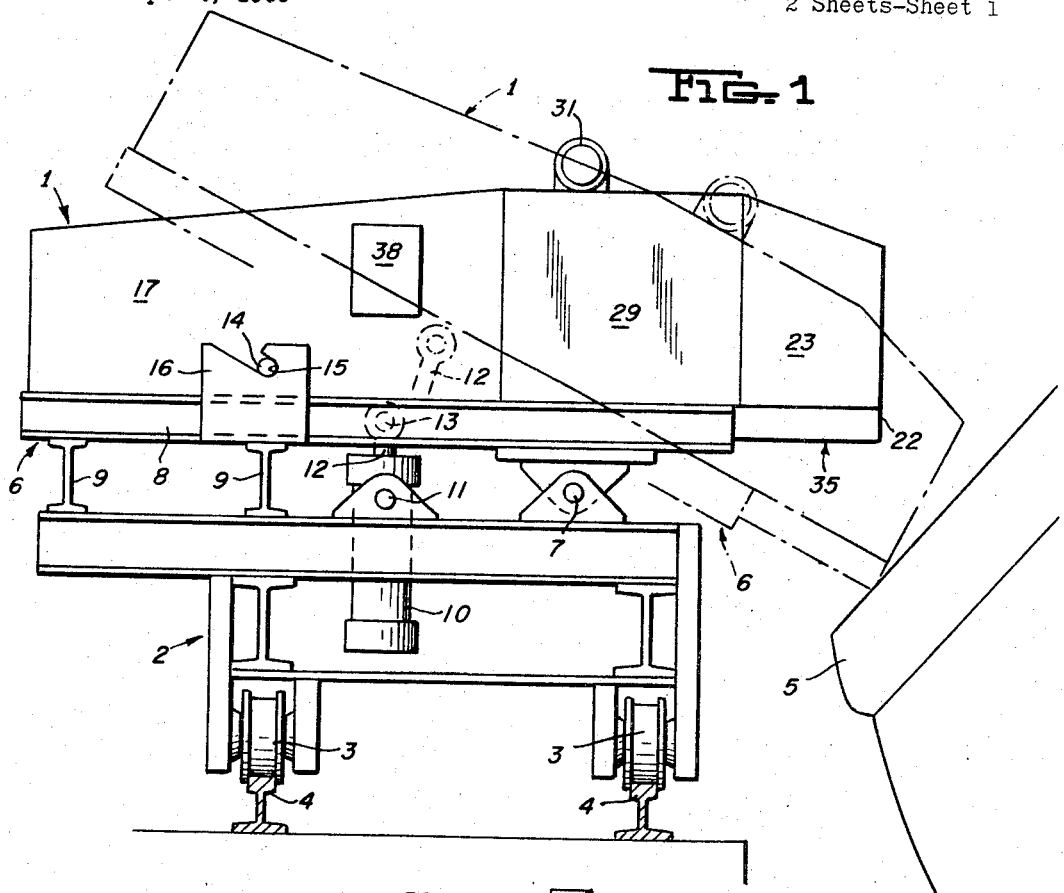
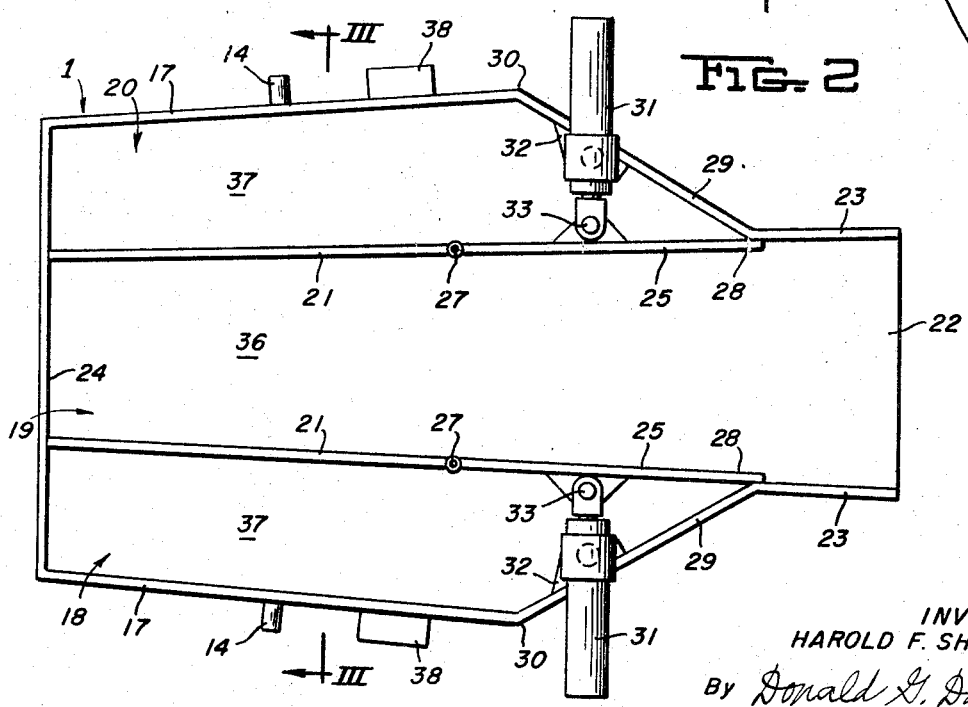

3,344,939
SCRAP CHARGING BOX
Harold F. Shekels, Edgewood Borough, Pa., assignor to United States Steel Corporation, a corporation of Delaware
Filed Sept. 3, 1965, Ser. No. 484,995
2 Claims. (Cl. 214—18)

ABSTRACT OF THE DISCLOSURE

A steelmaking furnace scrap charging box having a pair of parallel partition walls forming three longitudinally extending compartments and a discharge chute arranged centrally of and projecting from one end of said box, the sides of said chute being aligned with and forming extensions of said partition walls, and in which each of said partition walls is formed in part by a pivotal gate swingable from a closed position in which it connects the central compartment of said box with said chute to a second position in which it connects a side compartment of said box therewith.

---

This invention relates to apparatus for charging steel scrap in a furnace and, as indicated, to a charging box of improved construction.

The charging box of this invention, more specifically, is one of the type that is adapted to be pivotally supported at one side of a railway car for endwise tilting movement from a horizontal load conveying position to a vertically inclined position in which its contents will be discharged in a sidewise direction relative to the car into a furnace. Although especially adapted for charging scrap into steelmaking furnaces of the converter type in which the refining operation is effected by injecting oxygen into the furnace, it will be understood that such charging box may be used in apparatus for charging steel scrap into other types of furnaces, for example, an open hearth furnace as shown in my Patent No. 2,962,174.

In tiltable charging boxes of the type indicated above, the scrap has a tendency to bind or jam at any point of reduced dimension in its path of discharge movement through the box when it is elevated to an inclined scrap discharging position. Consequently, tiltable scrap boxes are usually constructed with a uniform width along their entire length to eliminate restrictions in the form of bottle-necks at which the scrap will bind or jam. In conventionally constructed boxes that are free of restrictions of this character, the maximum width of a box is thus dictated by the size of its discharge chute, which in turn is determined by the size of the door or opening through which the scrap is delivered into a furnace. This of course limits the scrap carrying capacity of such boxes.

Since the maximum width of the charging box is limited, conventional charging apparatus usually requires refilling of the scrap charging box when its capacity is insufficient for the needs of a given furnace, or the provision of a railway car with two or more boxes thereon that can be separately tilted to a charging position. Where several boxes are provided on a railway car, each box must be arranged separately in a charging position with respect to the furnce before its contents can be discharged into the furnace, and thus usually requires relocation of the railway car relative to the furnace before charging operation of each box thereon. The necessity of separately moving two or more boxes to a charging position in this manner, or of refilling a single scrap box one or more times in order to satisfy the requirements of a given furnace, obviously increases the time that is required for loading scrap in a furnace. The consequent loss of furnace operating time is particularly undesirable in oxygen steelmaking furnaces wherein the period of time between tapping and initiating a successive refining operation must be kept to a minimum in order to obtain maximum production capacity of the converter.

One of the principal objects of this invention, accordingly, is to provide a scrap charging box of improved construction in which its capacity is not determined by the size of its discharge chute. A further and related object is to increase the capacity of a scrap charging box and shorten the time required for charging its contents in a furnace. To these ends, the scrap charging box of this invention is constructed with a plurality of compartments that extend transversely with respect to its axis of tilting movement at one side of the railway truck chassis on which it is mounted, and with means for selectively connecting such compartments with the discharge chute through which the scrap is charged into the furnace. More particularly, the charging box compartments and the mechanism for selectively connecting such compartments with the discharge chute are constructed in such manner that the space through which the scrap moves into a furnace has no restrictions in which the scrap will jam or bind and thus prevent its movement into a furnace. By reason of this construction, the railway car carrying the box need only be moved once to locate the box in a charging position with respect to a furnace, and thus only a single operation to tilt the box to its discharge position is required in order that the scrap contents in each of its compartments may be charged into a furnace. In this manner the charging box of this invention both increases the amount of scrap that can be charged into a furnace and decreases the time that will be required for charging such scrap into a furnace.

Other objects and advantages of the invention will become apparent from the following description and accompanying drawing.

In the drawings there is shown a preferred embodiment of the invention. In this showing:

FIGURE 1 is a side elevational view of the charging box of this invention which illustrates the manner in which it is mounted on a railway truck chassis and shows it in charging position with respect to an oxygen steelmaking converter;

FIGURE 2 is a plan view of the charging box shown in FIGURE 1;

FIGURE 3 is a sectional view taken substantially along the line III—III of FIGURE 2; and FIGURE 4 is a plan view which is similar to FIGURE 2 but shows one of the compartment closure control gates in a different operating position in which it disconnects the center compartment of the charging box from the discharge chute and connects one of the end compartments of the charging box therewith.

FIGURE 1 of the drawings shows the manner in which the charging box 1 of this invention is mounted on a railway truck chassis 2 which is equipped with flanged wheels 3 for movement over railway tracks 4 to and from a charging position with respect to an oxygen steelmaking converter 5. The converter 5 is shown somewhat diagrammatically and in a tilted charging position for receiving scrap from the charging box 1.

The mounting of the charging box 1 on the truck chassis 2 provides for its movement from the horizontal load carrying position shown in solid lines to the vertically inclined position shown in dotted lines in which the contents of the box 1 will be charged into the converter 5 in a manner to be described. Such mounting comprises a cradle 6 that is supported at one side of the chassis 2 for tilting movement about the axis of a pivot 7 that extends in a lengthwise direction with respect to the carriage 2. In the lowered position of the cradle 6 shown in solid lines in FIGURE 1, beams 8 which form part of such cradle have supporting engagement on beams 9 that are secured to and form part of the railway truck chassis 2. Movement of the cradle 6 to the tilted position shown in dotted lines is effected by a hydraulic motor 10, the cylinder of which is pivotally supported by trunnions 11 on the chassis 2 and has a piston rod 12 projecting therefrom which has a pivot connection 13 with the cradle 6. Upon movement of the piston rod 12 to its extended position, the cradle 6 will be tilted to the inclined position shown in dotted lines in which the contents of the box 1 thereon will be charged into the converter 5 in a manner to be described. The support for the box 1 on the cradle 6 includes anchoring pins 14 projecting from opposite sides thereof which engage in notches 15 formed in anchoring plates 16 secured to opposite sides of cradle 6. Engagement of the pins 14 in the notches 15 serves to hold the box 1 against sliding movement toward the converter 5 when the cradle 6 is moved by the hydraulic motor 10 to the tilted charging position shown in dotted lines in FIGURE 1.

As best shown in FIGURE 2, the space between opposite sides 17 of the box 1 is separated into three longitudinally extending compartments 18, 19, and 20 by a pair of laterally spaced partition walls 21. A chute 22 centrally located at one end of the box provides for discharge of the scrap in the compartments 18-20 into the converter 5 or other steel refining furnace. Opposite sides 23 of the discharge chute 22 form extensions of the partition walls 21 and are spaced apart a distance at least equal to the maximum width of the compartments 18-20 and the central compartment 19 in particular. The partition walls 21 preferably converge slightly as shown in FIGURE 2 in a direction toward the end wall 24 so that the space through which the scrap gravitates gradually increases in a direction toward the discharge chute 22. In this manner, there are no restrictions which would jam or bind the gravitational discharge movement of the scrap from such compartments. The box side walls 17 similarly converge relative to the partition walls 21 in a direction toward the end wall 24 to provide for free discharge movement of the scrap through the chute 22 when the end compartments 18 and 20 are connected therewith in a manner to be described.

When the partition walls 21 are arranged as shown in FIGURE 2, the central compartment 19 is connected with the chute 22 for discharge of scrap therein through the chute 22, and the end compartments 18 and 20 are disconnected with respect to the chute 22. To provide for connection of each of the end compartments 18 and 20 with the chute 22, each of the partition walls 21 includes a portion in the form of a gate 25 that has a hinged connection 27, preferably a piano-type hinge, for swinging movement between opened and closed positions. In their closed positions, as shown in FIGURE 2, the gates 25 operate to disconnect the end compartments 18 and 20 from the chute 22 to prevent discharge of scrap from such compartments, while the central compartment 19 has a direct connection with the discharge chute 22. In their closed positions the forward ends 28 of each gate 25 engage the box end walls 29 which respectively angle rearwardly to the point 30 where they are connected with the box side walls 17. When the gates 25 swing to their open positions, their forward ends 28 engage the gate which remains in closed positions as shown in FIGURE 4 of the drawings. Latches (not shown) are provided for locking the gates 25 in their open and closed positions.

The operating mechanism for moving the gates 25 between their open and closed positions is illustrated diagrammatically as comprising fluid pressure motors 31 which are pivotally supported on brackets 32 mounted on the upper edge of the end walls 29. Each motor 31 has a piston rod projecting therefrom which is pivotally connected at 33 with the gate 25 operated thereby. Since the specific location of the piston rod 34 over the space through which scrap moves to the chute 22 might interfere with such scrap movement, it will be understood that the showing of the fluid pressure motors 31 is diagrammatic and only for the purpose of illustrating an operating mechanism for the gates 25, and that in practice such operating mechanism will preferably comprise an operating linkage or a rack-operated gear segment on the underside of the box 1 that is connected through the hinge connections 27 with the gates 25 for effecting their movement between open and closed positions.

As best shown in FIGURE 3, the bottom 35 of the box 1 is constructed so that the central portion 36 thereof, which forms the bottom of the central compartment 19 and the bottom of the chute 22, is at a level below that of the portions 37 thereof at the bottoms of the compartments 18 and 20. In this manner, the scrap moving from the compartments 18 and 20 to the chute 22 will be broken apart and separated as it falls from the bottom portions 37 onto the bottom portion 36. Electrical vibrators 38 of any suitable conventional construction, such as those known by the name "Syntron," are mounted on opposite sides 17 of the box to vibrate the box and thus keep scrap moving therethrough.

In operation the box 1 is placed on the car 2 after its compartments 18–20 are loaded with scrap and is then carried by the car 2 to a charging position in which its discharge chute 22 is centered directly opposite the converter 5. After tilting the converter 5 to the charging position shown in dotted lines in FIGURE 1, the motor 10 is actuated to pivot the cradle 6 and the box 1 carried thereby from their horizontal load carrying position shown in solid lines to the vertically inclined charging position shown in dotted lines in FIGURE 1. As the box 1 moves to this position, the chute 22 due to the location of the pivot axis 7 underneath and extending transversely with respect thereto moves to a position in which scrap moving therethrough will be charged into the converter 5. This operation is performed with both gates 25 in their closed positions as shown in FIGURE 2 so that the scrap in the central compartment 19 is charged first into the converter. Thereafter the gates 25 are swung successively to their open positions to empty the scrap in the end compartments 18 and 20 into the converter.

The central compartment 19 is preferably loaded with light scrap, one end compartment 18 with medium scrap, and the other compartment 20 with heavy scrap to protect the converter lining against damage. Since the compartment 19 is emptied first, the light scrap therein will be charged in the converter with a minimum of damage to the converter lining and will provide a cushion on which the medium scrap from the next compartment 18 to be emptied is received. The final compartment 20 to be emptied contains the heavy scrap which may then be charged into the converter without damage to its refractory lining.

As pointed out above, the converging relation in a rearward direction of the partition walls 21 relative to each other and with respect to the box end walls 17 results in the space through which the scrap moves to the charging chute 22 being of progressively increasing size. The specific construction of the box 1 in this respect thus eliminates any restrictions which would result in the scrap jamming or binding and being thus held against movement into the converter 5. Attention is particularly directed to the fact that the specific arrangement of the gates 25 is such that the width of the connection provided thereby for the compartments 18 and 20 with the chute 22 upon being swung to open position is larger than the width of the compartments 18 and 20 and enables the particles of scrap to separate as they move into the discharge chute 22. This separating action is of course improved by the stepped construction of the bottom 35 with the portions 36 and 37 thereof at vertically spaced levels as explained above.

From the foregoing it will be apparent that the compartmented construction of the box 1 of this invention increases its scrap carrying capacity. In addition, and since each compartment 18–20 can be emptied into the furnace without changing the position of the car chassis 1 or lowering the cradle 1, it will be further apparent that the specific compartmented construction of the box 1 reduces the time required to charge scrap in a furnace.

While one embodiment of my invention has been shown and described, it will be apparent that adaptations and modifications may be made without departing from the scope of the appended claims.

I claim:

1. Scrap charging apparatus comprising a charging box, a pair of laterally spaced parallel partition walls in said box separating the space therein into three longitudinally extending compartments, each of said walls comprising a gate supported for pivotal movement about an axis spaced inwardly from one end of said box, a discharge chute arranged centrally of and projecting outwardly from said one end of said box, said chute having sides that are aligned with and form extensions of said partition walls when said gates occupy parallel positions with the central compartment of said box connected with said chute, each of said gates being swingable from its said parallel position to a second position in which it disconnects said central compartment from said discharge chute and connects an end one of the remaining compartments therewith.

2. Scrap charging apparatus comprising a charging box, a pair of laterally spaced partition walls in said box separating the space therein into three longitudinally extending compartments, each of said walls comprising a gate supported for pivotal movement about an axis spaced inwardly from one end of said box, a discharge chute arranged centrally of and projecting outwardly from said one end of said box, said chute having sides that are aligned with and form extensions of said partition walls when said gates occupy closed positions with the central compartment of said box connected with said chute, each of said gates being swingable from its said closed position to a second position in which it disconnects said central compartment from said discharge chute and provides a connection for discharge movement of scrap in one of the other of said compartments into said discharge chute, the width of said discharge chute, gate controlled connections and compartments at any point spaced from the discharge end of said chute being no greater than the width of the said discharge end of said chute.

References Cited

UNITED STATES PATENTS 3,212,653  10/1965  Keen _____ 214—18
3,253,723  5/1966  Calderon _____ 214—18

GERALD M. FORLENZA, *Primary Examiner.*

ROBERT G. SHERIDAN, *Examiner.*